July 14, 1970     M. S. DECKER, JR     3,520,563
TORQUELESS CLAMP BAND
Filed Feb. 7, 1969     2 Sheets-Sheet 1
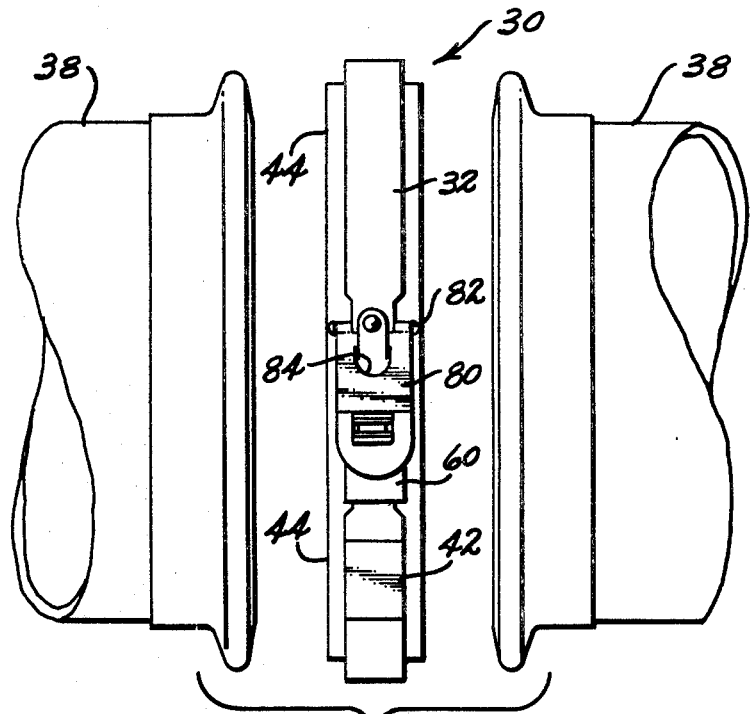
Fig. 1.
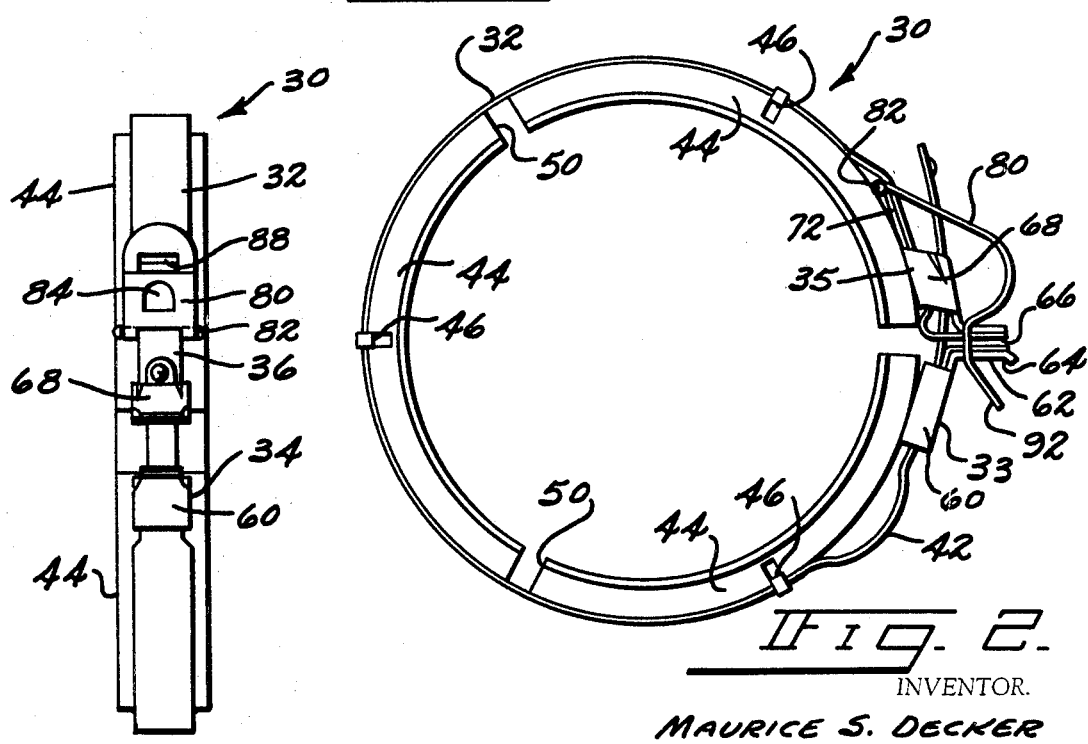
Fig. 2.
Fig. 3.
INVENTOR.
MAURICE S. DECKER
BY Harold L. Mensing
ATTORNEY July 14, 1970
M. S. DECKER, JR
3,520,563
TORQUELESS CLAMP BAND
Filed Feb. 7, 1969
2 Sheets-Sheet 2
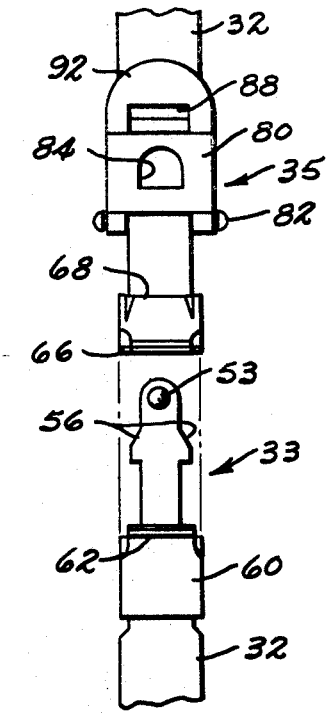
Fig. 5.
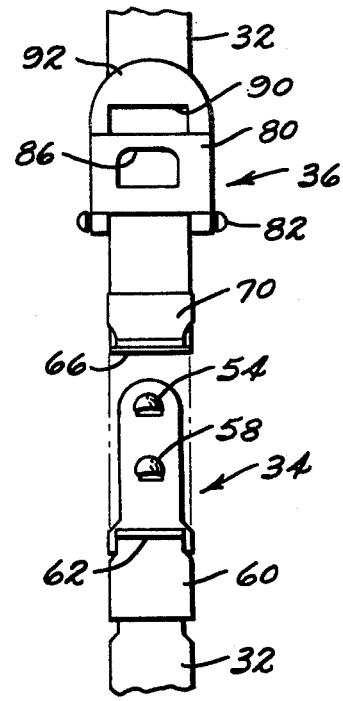
Fig. 6.
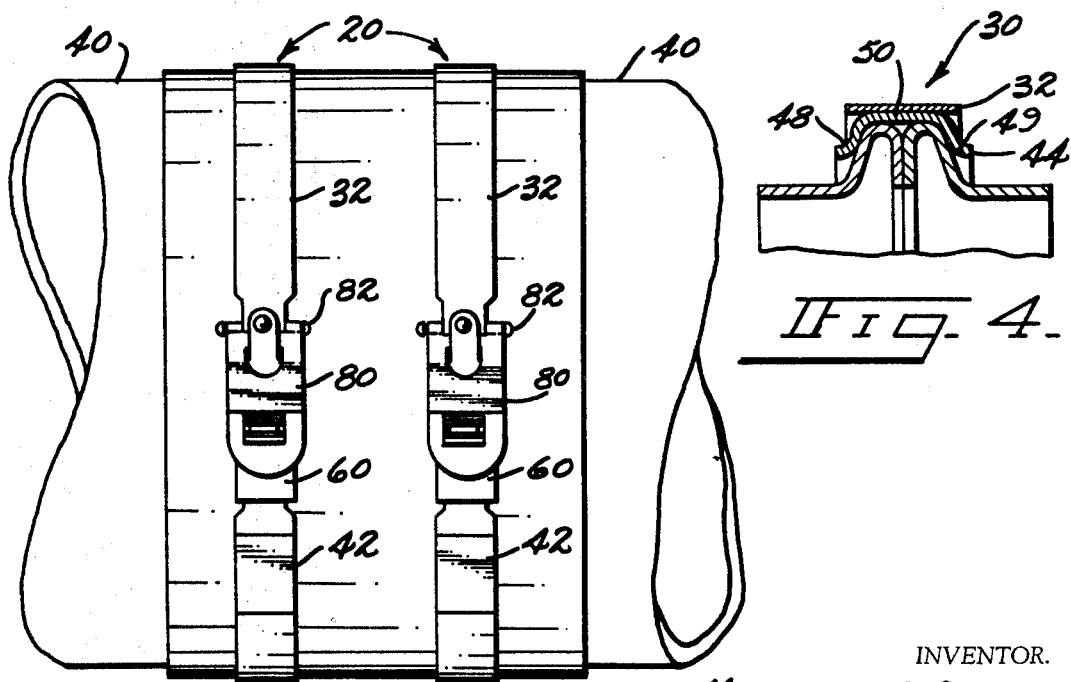
Fig. 7.
Fig. 4.
INVENTOR.
MAURICE S. DECKER
BY Harold L. Mensing
ATTORNEY United States Patent Office 3,520,563
Patented July 14, 1970

3,520,563
TORQUELESS CLAMP BAND
Maurice S. Decker, Jr., Columbus, Ohio, assignor to Midland-Ross Corporation, Toledo, Ohio, a corporation of Ohio
Filed Feb. 7, 1969, Ser. No. 797,539
Int. Cl. F16l 23/00, 55/00
U.S. Cl. 285—87                                    16 Claims

ABSTRACT OF THE DISCLOSURE

A clamping band for being tensioned with a predetermined amount of tension around an object such as the coaxially aligned adjacent ends of a conduit. The connectable ends of the band have a preliminary locking position and a final locking position. Projections are provided on the band ends whereby they may be manually drawn towards each other into the preliminary locking position and then further drawn together by means of pliers into final locking position. A hasp holds the ends in final locking engagement and prevents them from becoming separated.

BACKGROUND OF INVENTION

This invention relates to clamp bands having a binding strap with ends which may be readily connected and released repeatedly without damage to their components. These clamp bands are characterized by the fact that they are engineered to provide a predetermined tension or constructive force when fully locked around a specific size of conduit. Since the amount of tension of the installed clamp band is not left to the judgment of the person installing it, the problem of possibly applying too much or too little tension, when installing the clamp band, is eliminated. This feature and others make the clamp band of this invention particularly adapted for use as a conduit coupling for easily deformed thin walled conduit sections of the lightweight type used in aircraft. Examples of such couplings are described in the United States patents of Joseph F. Hill et al., 2,893,097 and 2,937,893 issued on July 7, 1959 and May 24 1960, respectively, and assigned to applicant's assignee. Conduits or ducts of the type described in these patents are used in the gas turbine bleed air systems of aircraft and may convey gases at temperatures and pressures of up to about 800° F. and 120 p.s.i.g. (pounds per square inch gauge). In servicing aircraft, these conduits must be disconnected frequently so as to provide access to equipment in the vicinity of the conduits and also removal of equipment attached to the conduits. Because of these conditions, a lightweight clamp band of a fail-proof design is required which will maintain its clamping effectiveness over a wide range of temperatures and pressures and which may be readily connected and disconnected without damage to itself or the object to be clamped. Prior art clamp bands of the type now in general usage, which employ a nut and bolt means for applying tension between the band ends, do not completely satisfy these requirements because they may be over-torqued or under-torqued by the installer.

SUMMARY OF THE INVENTION

Generally speaking, the clamp band of this invention comprises a flexible metal band having releasable interlocking ends. One connective end has a short tunnel extending along the band. The other end has a tongue for insertion through the tunnel. A protuberance or other catch means is provided near the tip of the tongue to engage the top portion of the far end of the tunnel, thereby connecting the band ends together in a prelocking position and loosely constricting the band around the object to be clamped. Located inwardly from the catch means is a locking means such as a lanced detent extending above the outer surface of the tongue or a pair of lugs extending laterally outward from the sides of the tongue. The locking means is located at a position on the tongue so that when the detent or pair of lugs is locked into engagement with the far end of the tunnel, the clamp band is properly tensioned around the object to be clamped. Projections which extend above the outer surface of the band are provided adjacent the band ends to be gripped manually and with pliers to first draw the band ends into prelocking position, and finally into a fully locked position. To further secure the band ends together, a hasp is hingedly attached to one band end for embracing the projection on the other band end. Preferably the hasp is hinged on the tunnel end of the band and designed to bear against the tongue end and hold it in locked position.

Therefore it is a general object of this invention to produce such a clamp band which is of simple and durable construction, easy to install, economical to manufacture, and which will maintain its clamping effectiveness even under extreme environmental conditions.

It is another object of this invention to produce a clamp band with improved means for connecting the ends of the band together and preventing them from accidentally becoming separated from each other.

It is still another object of this invention to produce a clamp band which has a resilient connecting means that is operative to hold the clamp band ends together in the event of failure of the other connecting means.

It is still another object of this invention to produce a clamp band which may have only one fully locked position so that it is not subject to being excessively tensioned around its conduit.

It is still another object of this invention to produce a clamp band which is designed so as not to require welds that will be subjected to tension loading and the concomitant possibility of failure due to failure of a weld.

It is a further object of this invention to produce a clamp which may be installed manually with the aid of ordinary pincers, such as Vise Grips, Channellocks, or the like.

The above mentioned objects and other objects and advantages and the manner of attaining them are described below with reference to embodiments of this invention shown in the accompanying drawings in which like reference numerals are used to designate the same or similar parts through the several figures of the drawings.

BRIEF DESCRIPTION OF THE DRAWINGS

FIG. 1 is an exploded radial view of an aircraft conduit connection showing a conduit coupling in fully locked position but with the conduit ends spaced from their normal position so as to show the details of their sealing flanges.

FIG. 2 is an axial view of the conduit coupling of FIG. 1 showing further detail of the conduit coupling.

FIG. 3 is a radial view of the conduit coupling shown in FIG. 1, but with the ends of the coupling only connected together in a pre-locking position.

FIG. 4 is a fragmentary sectional view of the aircraft conduit connection of FIG. 1 showing the cross sectional shape of the coupling member and the conduit flanges in their fully connected relationship.

FIG. 5 is a radial view of a clamp band similar to the conduit coupling shown in FIGS. 1–4, but with the conduit coupling segments removed from along the inside of the band and with the band ends fully disconnected.

FIG. 6 is a view of a clamp band similar to the one shown in FIG. 5, but with a different pre-locking means and final locking means.

FIG. 7 is a radial view of two clamp bands fully locked around a sleeve gasket connecting the ends of two conduit sections.

DETAILED DESCRIPTION

The drawings show a band type clamp 20 (see FIGS. 5–7) or coupling 30 (see FIGS. 1–4) comprising a flexible binding strap 32 preferably made from spring steel. The strap is provided with male and female connective end sections 33 or 34 and 35 or 36 respectively, which may be joined together to tension the strap around an object, such as the coaxially aligned ends of a duct or cylindrical conduit 38 or 40. The strap 32 may be given some lengthwise resiliency by providing one or more lateral bulges 42 or undulating sections intermediate the ends of the strap. A plurality of circular segments or pads 44, which jointly conform to the shape and size of the outer periphery of the duct or conduit ends, may be secured along the inside surface of the strap such as by means of tab fasteners 46 or by spot welding (see FIG. 2). These circular segments or pads 44 may be of the rigid type with a cross sectional design having two leg sections 48 and 49 extending outwardly in opposite directions from the ends of a slightly diverging U-shaped central section 50. The closed end of the U-shaped central section lies against the inner surface of the strap 32. Thus, the strap is provided with a substantially complete channeled ring for gripping the abutting ends of conduit sections. This design is particularly well adapted for use in coupling together sections of aircraft conduit because it is capable of urging the flanged ends of such a conduit into alignment and sealing engagement with each other as is described in greater detail in the aforementioned U.S. Pat. 2,937,893 of J. F. Hill et al., including the present applicant, issued on May 24, 1960 to the applicant's assignee. The cross sectional shape of the pads 44 and the cooperating conduit flanges may be altered without departing from the scope of the present invention. The clamp band 20 of FIGS. 5–7 utilizes a strap 32 without such pads or circular segments. In this embodiment a resilient gasket or hose 52 is telescoped over adjacent ends of the conduit sections 40 and held in sealing engagement thereon by means of a pair of clamp bands 20. A single clamp band 20 may be used in connecting a piece of flexible tubing to a single section of rigid conduit.

The male end section 33 or 34 of the strap 32 has a neck portion which may be substantially narrower than the adjoining section of the strap (see FIGS. 5 and 6). Preferably the tip or head end of the neck is rounded or otherwise fashioned so as to promote easy entry into the female portion 35 or 36. Adjacent this head end is a preliminary latching or pre-locking means such as a small dome or nodule 53 or lanced detent 54. A locking means is located between this preliminary latching or pre-locking means and the base of the neck portion. This locking means may comprise barb-like lugs 56 which extend laterally outwardly from the neck portion (see FIG. 5) or it may comprise a second lanced detent 58 protruding above the surface of the neck portion of the strap (see FIG. 6). Adjacent the base of the neck portion, but spaced slightly rearwardly therefrom, a narrow section may be provided in the strap for retaining an end bracket 60. The end bracket is rigidly attached to the strap such as by wing sections which extend from a shank portion of the bracket and may be wrapped around the strap to embrace the aforementioned narrow section. Thus, movement of this bracket towards the head end of the strap is positively prevented by the shoulder formed by the wider intervening portion of the strap. The end bracket 60, in addition to the shank portion which is disposed along the strap, also has an upturned portion 62 which is disposed radially or normally with respect to the strap. Preferably the tip 64 of the upturned portion 62 is hooked rearwardly so as to prevent the accidental displacement of a hasp which will be described later herein. A reinforcing member, which backs-up and is coextensive with the shank and upturned portions of the bracket, may be affixed thereon such as by spot welding. To avoid stress concentration at the bend in the bracket, the bend may be given a substantial radius rather than being severely angular.

The female end section 35 or 36 of the strap 32 has an upturned portion 66 similar to the unturned portion of the bracket 62 on the male end section 33 or 34. A slot slightly larger than a size which is just sufficient to receive the male end section 33 or 34 is provided in the upturned portion 66 adjacent its base. The bend at the base of the upturned portion 64 may be in the form of a corrugation with its heel portion on a level with the inner surface of the strap 32 (see FIG. 2). Extending back along the strap from the upturned portion 66 is a tunnel defining member 68 or 70 which may be attached to the strap by means of wing sections 72 that fold under and embrace the strap. Preferably the embraced portion of the strap is narrowed so as to provide shoulders for preventing the tunnel member from slipping towards the strap end when placed under tension. Also, the embraced section may be offset the thickness of the wing sections so that the level of the inner surface of the strap is substantially maintained. A portion of the tunnel defining member 68 or 70 may extend along and be attached to the upturned portion 66 above the slot, such as by spot welding. It is to be noted that a spot weld at this point, or a any of the other points where spot welding is mentioned as a means of attaching portions of the clamp band together, will not be subjected to tension loading. Although these spot welds may add some structural strength to the clamp band, they are primarily used for convenience of assembly. The walls of the tunnel member 68, which is adapted for use with the male end section 33, preferably form a rectangular opening at its entrance end and a hat shaped opening at its other end hereinafter called a locking end. To achieve the hat shaped form comprising a generally rectangular crown section atop an elongated generally rectangular brim section, the upper corners of the tunnel may be depressed inwardly and downwardly at a converging angle. The brim section or lower portion of the locking end of the tunnel is of sufficient size to permit the passage therethrough of the locking lug section of the male end 33. The crown section or upper portion of the locking end of the tunnel is narrower than the locking lug section of the male end 33 but slightly winder than the neck portion of the male end 33. Thus, the locking lug section is cammed towards the lower portion of the tunnel when it is passed through the tunnel. After the locking lug section of the male end 33 clears the tunnel end, it springs into locking position in the narrow upper portion of the tunnel. The face of the locking end of the tunnel may be inclined so that when the male end 33 is in fully locked position the face is at an angle of 90° or less with respect to the plane of the male end 33. With this construction, the tension of the strap serves to hold the male end 33 preferentially in a fully locked position against the roof of the tunnel. The cross sectional shape of the tunnel member 70, which is adapted for use with male end 34, may be of uniform rectangular size throughout its entire length. Preferably its length is selected so that, when the face of the locking lanced detent 58 adjacent the base of male end 34 is in locking contact with the face of the locking end of the tunnel, the clamp band 20 or coupling 30 has been applied with the proper predetermined or limited amount of tension.

In installations where accidental release of the locking means might present a problem, a hasp 80 may be provided to hold the male end 33 or 34 in a fully locked position and also to provide an auxiliary means for holding the ends of the strap 32 together in case of the accidental release of the locking means. The hasp 80 is pivotally attached to the strap, preferably on the female end of the strap a substantial distance beyond the locking end of the tunnel 68 or 70, by means of a hinge pin 82 extending across the underside of the strap and abutting the edge of the wing sections 72. Adjacent the hinged end of the hasp is an aperture 84 or 86 for freely receiving the tip of the male end 33 or 34. The aperture 84 or 86 is located so that an edge of the aperture firmly engages the underside of the penetrating male end 33 or 34 in a beyond the top-dead-center relationship when the hasp is in its fully locked position. Thus, the hasp and the male end co-act to hold each other in their fully locked positions. The hasp may be arcuately bent along its length to provide for limited resiliency in its effective length so that its free end may be forced over the upturned projection 66 on the opposite end of the strap. An aperture 88 or 90, for embracing the upturned portions or projections 62 and 66, may be located adjacent the free end of the hasp at a position which requires some stretching of the effective length of the hasp to place it over and around these upturned portions or projections. The end of the hasp may be upturned to provide a tab 92 to facilitate manipulation of the hasp.

In applying the clamp band or coupling, the male end is manually inserted into the female end far enough to engage the latching means in a prelocking position. A pair of pincers or pliers is used to further tension the clamp band or coupling around the conduit and place its ends in fully locked position. Then the hasp is rotated into engagement with the underside of the male end and stretched over the upturned portion or projection on the male end. The clamp band or coupling may be readily removed without damage to itself by merely reversing the above mentioned steps and depressing the male end to free it from contact with the locking means.

While the invention has been described with reference to specific embodiments, various modifications will be apparent to those skilled in the art, and it is to be understood that such modifications can be made without departing from the scope of the invention.

I claim:
1. A clamp band comprising: a length of flexible strap having a means for releasably connecting its ends together, said connecting means having a male member and a female member, locking lugs extending from said male member, means on said female member defining an opening which extends from said strap to a position above said strap, the portion of said opening adjacent said strap having a width sufficient for passing the locking lug section of said male member therethrough, the portion of said opening remote from said strap having a sufficiently narrower width to engage said locking lugs and restrain said section from being pulled backward through said narrow portion of said opening, and means for maintaining said male member in said narrow portion of said opening.

2. A device according to claim 1 wherein said opening defining means defines a tunnel which extends lengthwise with respect to said strap, and at least a portion of the walls of said tunnel are inclined towards each other in a direction away from the tunnel entrance whereby said male member is cammed towards the wide portion of said opening until said locking lugs pass through said tunnel.

3. A device according to claim 1 wherein said male member has a detent adjacent its tip end for engagement with an edge of said opening defining means whereby the said male and female members are held together in a prelocking position.

4. A device according to claim 1 wherein one of said members has a projection and the other of said members has a springable hasp for hooking over said projection.

5. A device according to claim 4 wherein said hasp has means for holding said male member in locking position in the narrow portion of said opening on said female member.

6. A device according to claim 1 wherein said male and female members have projections for engagement by a pincer for drawing said members towards each other into a locking relationship, and a springable hasp on one of said members for hooking over the projection on the other of said members.

7. A device according to claim 1 wherein said strap has resilient means intermediate its ends whereby its effective length is limitedly variable.

8. A device according to claim 1 wherein segments which jointly conform to the peripheral shape of the object to be clamped are anchored along the inside surface of said strap.

9. A clamp band which may be locked around the object to be clamped without deforming the parts of the clamp band beyond their elastic limit, said band comprising a length of flexible strap having means for releasably locking its free ends together, a projection on one of said ends, and a hasp having means separate from said clamp band pivotally securing it on the other of said ends said hasp provided with means for engaging said projection to insure against separation of said ends in the event of accidental release of said locking means.

10. A device according to claim 9 wherein said hasp is made of spring steel and is arcuately bent along its length to provide limited resiliency in its effective length.

11. A device according to claim 9 wherein said hasp has means which bears against said locking means to prevent accidental release of said locking means.

12. A clamp band comprising: a length of flexible strap having a longitudinally yieldable portion intermediate its ends, means for releasably connecting said ends together, said connecting means having a male member at one of said ends and a femle member at the other of said ends, a projection on each of said members to be used for drawing said members towards each other into connected relationship such as by means of pliers, a hasp movably attached on said female end for spanning said projections and means on said hasp releasably engaging the projection on said male member, and means on said hasp for maintaining said male member in said connected relationship with said female member.

13. A clamp band according to claim 12 wherein said male member has locking lugs extending therefrom, said female member has a means defining a tunnel for receiving and containing a portion of said male member, said tunnel extending lengthwise of said strap and with at least a portion of the walls of said tunnel converging in a direction away from the entrance of said tunnel.

14. A clamp band comprising: a length of flexible strap having means for releasably connecting the ends thereof together, said connecting means having a male member adjacent one end and a female member adjacent the other end, means for holding said members in a preliminary locking position, means for holding said members in a final locking position, projections on said members for moving said members towards each other from said preliminary locking position to said final locking position such as by means of pincers, and a hasp on one of said members having means engaging the projection on the other of said members whereby said ends are held together in the event of accidental release of said locking means.

15. A device according to claim 14 wherein said hasp has a means which bears against said male member to prevent accidental release of said connecting means.

16. A device according to claim 14 adapted for use as a conduit coupling further comprising a plurality of segments fastened along the inside of said strap, which segments jointly conform to the peripheral shape of the ends of said conduit and have means for urging said conduit ends towards each other into sealing engagement.

References Cited
UNITED STATES PATENTS

| | | | |
|---|---|---|---|
| 420,076 | 1/1890 | Kohlmyer | 285—420 X |
| 2,541,205 | 2/1951 | Christophersen | 285—410 |
| 2,760,262 | 8/1956 | Homan | 24—20 |
| 2,846,244 | 8/1958 | Parker | 285—409 |
| 2,876,514 | 3/1959 | Murphy | 24—20 |
| 2,937,893 | 5/1960 | Hill et al. | 285—408 X |
| 3,276,089 | 10/1966 | Cheever et al. | 285—409 X |
| 3,311,957 | 4/1967 | Dunn | 24—21 |

DAVE W. AROLA, Primary Examiner

U.S. Cl. X.R.

24—24, 201; 285—408, 420